(12) United States Patent
Hucul

(10) Patent No.: US 6,376,622 B1
(45) Date of Patent: Apr. 23, 2002

(54) PROCESS FOR HYDROGENATING AROMATIC POLYMERS

(75) Inventor: Dennis A. Hucul, Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/717,868

(22) Filed: Nov. 21, 2000

Related U.S. Application Data

(60) Provisional application No. 60/191,371, filed on Mar. 22, 2000, and provisional application No. 60/169,566, filed on Dec. 8, 1999.

(51) Int. Cl.⁷ .................................................. C08F 8/04
(52) U.S. Cl. .................. 525/338; 502/240; 502/258; 502/259; 502/260; 502/261; 502/262; 525/332.8; 525/332.9; 525/333.1; 525/333.2; 525/339
(58) Field of Search ................................. 525/338, 339; 502/240, 258, 259, 260, 261, 262

(56) References Cited

U.S. PATENT DOCUMENTS

| | | |
|---|---|---|
| 4,452,951 A | 6/1984 | Kubo et al. |
| 4,617,060 A | 10/1986 | Dreibelbis |
| 5,028,665 A | 7/1991 | Hucul |
| 5,352,744 A | 10/1994 | Bates et al. |
| 5,612,422 A | 3/1997 | Hucul et al. |
| 5,654,253 A | 8/1997 | Hucul et al. |

FOREIGN PATENT DOCUMENTS

| | | |
|---|---|---|
| EP | 378104 | 7/1990 |
| JP | 03076706 | 4/1991 |

Primary Examiner—Bernard Lipman

(57) ABSTRACT

The present invention is directed to a hydrogenation catalyst and a process for hydrogenating an aromatic polymer having a number average molecular weight (Mn) of from 40,000 to less than 120,000 comprising contacting the aromatic polymer with a hydrogenating agent in the presence of a silica supported metal hydrogenation catalyst, characterized in that the silica has a pore size distribution such that at least 95 percent of the pore volume is defined by pores having diameter from 300 to 1000 angstroms, less than 4 percent of the pore volume is defined by pores having a diameter of 200 angstroms or less and at least 80 percent aromatic hydrogenation is achieved.

14 Claims, No Drawings

PROCESS FOR HYDROGENATING AROMATIC POLYMERS

CROSS REFERENCE STATEMENT

This application claims the benefit of U.S. Provisional Application No. 60/191,371, filed Mar. 22, 2000 and U.S. Provisional Application No. 60/169,566, filed Dec. 8, 1999.

The present invention is directed to a process for hydrogenating a low molecular weight aromatic polymer.

BACKGROUND OF THE INVENTION

Aromatic polymers have been previously hydrogenated using a variety of catalysts and conditions. Historically, typical hydrogenation catalysts have low reactivity and require high catalyst to polymer ratios.

Japanese Patent Application 03076706 describes a process for hydrogenating an aromatic polymer using a silica supported metal hydrogenation catalyst. These catalysts use a silica support of small pore diameter (200 to 500 angstroms), high surface area (100–500 $m^2/g$) and achieve hydrogenation levels of greater than 70 percent. However, to achieve high hydrogenation levels, large amounts of catalyst (1–100 weight percent based on resin) and high temperatures (170° C.) are required which cause polymer degradation as exemplified by the decrease in the Mn after hydrogenation.

U.S. Pat. No. 5,028,665 describes a process for hydrogenating an unsaturated polymer using a supported metal hydrogenation catalyst wherein the support contains a majority of pores having diameters greater than 450 angstroms. However, the catalyst is limited by a small surface area and enables 90 to 100 percent olefinic hydrogenation but less than 25 percent aromatic hydrogenation.

U.S. Pat. No. 5,352,744 issued to Bates et al. describes a process for hydrogenating poly(alkenyl aromatic) or poly (alkenyl aromatic)/polydiene block copolymers, that provides hydrogenated polymers with 99.5% or greater saturation, using a metal catalyst on an alkaline metal salt support. Although Bates teaches from 0.01 to 10 grams of catalyst per gram of polymer may be used, a ratio of greater than 1.0 gram of catalyst per gram of polymer is needed to reach high hydrogenation levels.

Silica has long been used as a support for metal catalysts. Typically, the silica used as a support has had high surface area (200–600 $m^2/g$) and small average pore diameter (20 to 40 angstroms). Very low hydrogenation levels are obtained when hydrogenating high molecular weight aromatic polymers using metal hydrogenation catalysts supported by this type of silica.

U.S. Pat. No. 5,612,422 discloses a metal hydrogenation catalyst comprising a silica support characterized in that the silica has a pore size distribution such that at least 98 percent of the pore volume is defined by pores having a diameter of greater than 600 angstroms. However, these catalysts are typically used to hydrogenate polymers of 100,000 Mw or higher and offer lower than desired rates for the hydrogenation of lower Mw polymers.

Accordingly, it remains highly desirable to provide a hydrogenation catalyst and process of hydrogenating unsaturated polymers, particularly a low molecular weight aromatic polymer at high levels, which does not exhibit the foregoing disadvantages.

SUMMARY OF THE INVENTION

The present invention is therefore directed to a catalyst and a process for hydrogenating an unsaturated polymer. The catalyst is particularly useful in hydrogenating aromatic polymers as well as polymers containing olefinic unsaturation. The catalyst comprises a silica supported metal catalyst characterized in that the silica has a surface area of from 30 to 120 $m^2/g$ and a pore size distribution such that at least 95 percent of the pore volume is defined by pores having diameter of from 300 to 1000 angstroms, and less than 4 percent of the pore volume is defined by pores having a diameter of 200 angstroms or less.

Another aspect of the present invention is a process for hydrogenating an aromatic polymer having a number average molecular weight (Mn) of from 40,000 to less than 120,000 comprising contacting the aromatic polymer with a hydrogenating agent in the presence of a silica supported metal hydrogenation catalyst, characterized in that the silica has a pore size distribution such that at least 95 percent of the pore volume is defined by pores having diameter from 300 to 1000 angstroms, less than 4 percent of the pore volume is defined by pores having a diameter of 200 angstroms or less and at least 80 percent aromatic hydrogenation is achieved.

Because of the high efficiency of the present catalyst, this process can be used in hydrogenating numerous unsaturated polymers, especially an aromatic polymer, such as polystyrene, to produce a hydrogenated polymer such as polyvinylcyclohexane without the disadvantages of the prior art.

DETAILED DESCRIPTION OF THE INVENTION

The polymers to be hydrogenated by the process of the present invention, include any unsaturated polymer containing olefinic or aromatic unsaturation. Such polymers include any amorphous saturated hydrocarbon thermoplastic. The term saturated refers to the amount of olefinic bonds within the chemical structure. As used herein, saturated refers to a polymer wherein less than 10 percent of the carbon-carbon bonds are olefinic or unsaturated in nature, generally less than 7.5 percent, typically less than 5 percent, advantageously less than 2 percent, more advantageously less than 1.5 percent, preferably less than 1 percent, more preferably less than 0.5 percent and most preferably less than 0.2 percent. These types of polymers include hydrogenated aromatic polymers, hydrogenated cyclic-olefin-(co) polymers and hydrogenated ring opening metathesis polymers. Specific hydrocarbon polymers include those produced from olefinic monomers, such as homopolymers of butadiene or isoprene, copolymers thereof, and aromatic polymers and copolymers. The aromatic polymers useful in the process of the present invention include any polymeric material containing pendant aromatic functionality. Preferably the Mn is from 40,000 to less than 120,000, more preferably less than 110,000 and most preferably less than 100,000. Pendant aromatic refers to a structure wherein the aromatic group is a substituent on the polymer backbone and not embedded therein. Preferred aromatic groups are $C_{6-20}$ aryl groups, especially phenyl. These polymers may also contain other olefinic groups in addition to aromatic groups. Preferably, the polymer is derived from a monomer of the formula:

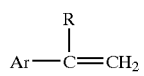

wherein R is hydrogen or alkyl, Ar is phenyl, halophenyl, alkylphenyl, alkylhalophenyl, naphthyl, pyridinyl, or anthracenyl, wherein any alkyl group contains 1 to 6 carbon atoms which may be mono- or multisubstituted with functional groups such as halo, nitro, amino, cyano, carbonyl and carboxyl. More preferably Ar is phenyl or alkylphenyl with phenyl being most preferred. Homopolymers may have any stereostructure including syndiotactic, isotactic or atactic; however, atactic polymers are preferred. In addition, copolymers containing these aromatic monomers including random, pseudo random, block and grafted copolymers may be used. For example, copolymers of vinyl aromatic monomers and comonomers selected from nitrites, acrylates, acids, ethylene, propylene, maleic anhydride, maleimides, vinyl acetate, and vinyl chloride may also be used such as styrene-acrylonitrile, styrene-alpha-methylstyrene and styrene-ethylene. Block copolymers of vinyl aromatic monomers and conjugated dienes such as butadiene, isoprene may also be used. Examples include styrene-butadiene, styrene-isoprene, styrene-butadiene-styrene and styrene-isoprene-styrene copolymers. Further examples of block copolymers may be found in U.S. Pat. Nos. 4,845,173, 4,096,203, 4,200,718, 4,201,729, 4,205,016, 3,652,516 3,231,635, and 3,030,346. Blends of polymers including impact modified, grafted rubber containing aromatic polymers may also be used.

Cyclic-olefin-copolymers suitable for hydrogenation are copolymers of cycloolefin monomers with any other monomer containing aromatic and/or olefinic unsaturation. Cyclic-olefin copolymers include norbornene-type polymers as described in U.S. Pat. Nos. 5,115,041, 5,142,007, 5,143,979, all of which are incorporated herein by reference. The cycloolefin moiety may be substituted or unsubstituted. Suitable cycloolefin monomers include substituted and unsubstituted norbornenes, dicyclopentadienes, dihydrodicyclopentadienes, trimers of cyclopentadiene, tetracyclododecenes, hexacycloheptaciecenes, ethylidenyl norbornenes and vinyinorbornenes. Substituents on the cycloolefin monomers include hydrogen, alkyl alkenyl, and aryl groups of 1 to 20 carbon atoms and saturated and unsaturated cyclic groups of 3 to 12 carbon atoms which can be formed with one or more, preferably two, ring carbon atoms. Generally speaking, the substituents on the cycloolefin monomers can be any which do not poison or deactivate the polymerization catalyst. Examples of preferred monomers include but are not limited to dicyclopentadiene, methyltetracyclododecene, 2-norbornene, and other norbornene monomers such as 5-methyl-2-norbornene, 5,6-dimethyl-2-norbornene, 5-ethyl-2-norbornene, 5-ethylidenyl-2-norbornene, 5-butyl-2-norbornene, 5-hexyl-2-norbornene, 5-octyl-2-norbornene, 5-phenyl-2-norbornene, 5-dodecyl-2-norbornene, 5-isobutyl-2-norbornene, 5-octadecyl-2-norbornene, 5-isopropyl-2-norbornene, 5-p-toluyl-2-norbornene, 5-α-naphthyl-2-norbornene, 5-cyclohexyl-2-norbornene, 5-isopropenyl-2-norbornene, 5-vinyl-2-norbornene, 5,5-dimethyl-2-norbornene, tricyclopentadiene (or cyclopentadiene trimer), tetracyclopentadiene (or cyclopentadiene tetramer), dihydrodicyclopentadiene (or cyclopentene-cyclopentadiene co-dimer), methyl-cyclopentadiene dimer, ethyl-cyclopentadiene dimer, tetracyclododecene 9-methyl-tetracyclo[6,2,1,13,6O2,7]dodecene-4, (or methyl-tetracyclododecene), 9-ethyl-tetracyclo[6,2,1,13,6O2,7]dodecene-4, (or ethyl-tetracyclododecene), 9-hexyl-tetracyclo[6,2,1,13,6O2,7]-dodecene-4, 9-decyl-tetracyclo[6,2,1,13,6O2,7]dodecene-4, 9-decyl-tetracyclo[6,2,1,13,6O2,7]dodecene-4, 9,10-dimethyl-tetracyclo[6,2,1,13,6O2,7]dodecene-4, 9-methyl-10-tetracyclo[6,2,1,13,6O2,7]dodecene-4, 9-methyl-10-ethyl-tetracyclo[6,2,1,13,6O2,7] dodecene-4, 9-cyclohexyl-tetracyclo[6,2,1,13,6O2,7]dodecene-4, 9-chloro-tetracyclo[6,2,1,13,6O2,7]dodecene-4, 9-bromo-tetracyclo[6,2,1,13,6O2,7]dodecene-4, 9-fluoro-tetracyclo[6,2,1,13,6O2,7]dodecene-4, 9-isobutyl-tetracyclo[6,2,1,13,6O2,7]dodecene-4, and 9,10-dichloro tetracyclo[6,2,1,13,6O2,7]dodecene-4.

Polymers comprising two or more different types of monomeric units are also suitable. For example, copolymers of methyltetracyclododecane (MTD) and methyinorbornene (MNB) are especially suitable. More preferably, the polymers comprise three or more different types of monomeric units, e.g., terpolymers, including MTD, MNB and dicyclopentadiene (DCPD).

Ring opening metathesis polymers include polymers and copolymers prepared by metathesis ring opening (co) polymerization of a norbornene or tetracyclododecene, such as those described in J-85/26,024 and U.S. Pat. No. 5,053,471 which is incorporated herein by reference.

An important aspect in developing hydrogenation catalysts for polymeric materials with fast reaction rates is to ensure that the pore structure of the catalyst support minimizes diffusion problems of the polymeric molecules. For polymers having a number average molecular weight (Mn) of from approximately 40,000 to less than 120,000, preferably less than 110,000, more preferably less than 100,000, it has been discovered that pore diameters in the region of 300 to 1000 angstroms help facilitate polymer diffusion. In addition to having pores that are relatively large it is also necessary to have a pore structure that minimizes the pores that have a small diameter due to their tendency to plug with the polymers of interest. It is therefore required that the catalyst support have little or no pores in the region below about 200 angstroms.

The silica support used in the process of the present invention has a narrow pore size distribution and surface area from 30 to 120 meters squared per gram ($m^2/g$).

The pore size distribution, pore volume, and average pore diameter can be obtained via mercury porosimetry following the proceedings of ASTM D-4284-83.

The pore size distribution is typically measured using mercury porosimetry. However, this method is only sufficient for measuring pores of greater than 60 angstroms. Therefore, an additional method must be used to measure pores less than 60 angstroms. One such method is nitrogen desorption according to ASTM D-4641-87 for pore diameters of less than about 600 angstroms. Therefore, narrow pore size distribution is defined as the requirement that at least 95 percent of the pore volume is defined by pores having pore diameters of from 1000 to 300 angstroms and that the pore volume measured by nitrogen desorption for pores less than 200 angstroms, be less than 4 percent of the total pore volume measured by mercury porosimetry.

The surface area can be measured according to ASTM D-3663-84. The surface area is typically between 30 and 120 $m^2/g$, preferably between 35 and 100 with most preferred between 35 and 90 $m^2/g$.

The desired average pore diameter is dependent upon the aromatic polymer which is to be hydrogenated and its molecular weight. Average pore diameters are typically between 300 and 1000 angstroms, preferably between 400 and 900 angstroms.

The silica used as the support in the process of the present invention can be made by processes as described in Iler, R. K., *The Chemistry of Silica*, John Wiley and Sons, 1979, pp. 510–581, The metal used in the hydrogenation catalyst can be any metal which will increase the rate of hydrogenation including nickel, cobalt, rhodium, ruthenium, palladium, platinum, other Group VIII metals, or combinations thereof. Preferably rhodium or platinum is used. However, platinum is known to be a poor hydrogenation catalyst for nitrites, therefore, platinum would not be preferred in the hydrogenation of nitrile copolymers.

The catalyst can also comprise a second component comprising a promoter which inhibits deactivation of the Group VIII metal(s) upon exposure to polar materials, and is herein referred to as the deactivation resistant component. Such components preferably comprise rhenium, molybdenum, tungsten, tantalum or niobium or mixtures thereof.

The amount of the deactivation resistant component is at least an amount which significantly inhibits the deactivation of the Group VIII metal component when exposed to polar impurities within a polymer composition, herein referred to as a deactivation inhibiting amount. Deactivation of the Group VIII metal is evidenced by a significant decrease in hydrogenation reaction rate. This is exemplified in comparisons of a mixed hydrogenation catalyst and a catalyst containing only a Group VIII metal component under identical conditions in the presence of a polar impurity, wherein the catalyst containing only a Group VIII metal component exhibits a hydrogenation reaction rate which is less than 75 percent of the rate achieved with the mixed hydrogenation catalyst.

Preferably, the amount of deactivation resistant component is such that the ratio of the Group VIII metal component to the deactivation resistant component is from 0.5:1 to 10:1, more preferably from 1:1 to 7:1, and most preferably from 1:1 to 5:1.

The silica supported catalyst can be made using the supports described herein, by the process described in U.S. Pat. No. 5,110,779, which is incorporated herein by reference. An appropriate metal or metal containing compound can be deposited on the support by vapor phase deposition, aqueous or nonaqueous impregnation followed by calcination, sublimation or any other conventional method, such as those exemplified in *Studies in Surface Science and Catalysis*, "Successful Design of Catalysts" V. 44, pg. 146–158, 1989 and *Applied Heterogeneous Catalysis* pgs. 75–123, Institute Francais du Pétrole Publications, 1987. In methods of impregnation, the appropriate metal containing compound can be any compound containing a metal, as previously described, which will produce a usable hydrogenation catalyst. These compounds can be salts, coordination complexes, organometallic compounds or covalent complexes and are preferably metal halide salts with metal chloride salts being most preferred. Typically, the metal is 0.1 to 10 wt. percent of the silica supported catalyst. Preferable amounts are from 0.5 to 8 wt. percent, more preferably 1 to 5 wt. percent based on total catalyst weight.

Promoters, such as alkali, alkali earth or lanthanide containing compounds, can also be used to aid in the dispersion of the metal onto the silica support or stabilization during the reaction, though their use is not preferred.

The amount of catalyst used in the hydrogenation process is much smaller than the amount required in conventional aromatic polymer hydrogenation reactions due to the high reactivity of the present catalysts. Generally, amounts of less than 1 gram of catalyst per gram of aromatic polymer are used, with less than 0.1 gram being preferred and less than 0.05 being more preferred. The amount of catalyst used is dependent upon the type of process, whether it is continuous, semi-continuous or batch, and the process conditions, such as temperature, pressure and reaction time wherein typical reaction times may vary from about 5 minutes to about 5 hours. Continuous operations can typically contain 1 part by weight catalyst to 200,000 or more parts aromatic polymer since the catalyst is reused many times during the course of continuous operation. Typical batch processes can use 1 part by weight catalyst to 5,000 parts aromatic polymer. Higher temperatures and pressures will also enable using smaller amounts of catalyst.

The hydrogenation reaction can be conducted in the absence of a solvent but is preferably conducted in a hydrocarbon solvent in which the polymer is soluble and which will not hinder the hydrogenation reaction. Preferably the solvent is a saturated solvent such as cyclohexane, methylcyclohexane, ethylcyclohexane, cyclooctane, cycloheptane, dodecane, dioxane, diethylene glycol dimethyl ether, tetrahydrofuran, isopentane, decahydronaphthalene or mixtures thereof, with cyclohexane being the most preferred.

The temperature at which the hydrogenation is conducted can be any temperature at which hydrogenation occurs without significant degradation of the polymer. Degradation of the polymer can be detected by a decrease in Mn, an increase in polydispersity or a decrease in glass transition temperature, after hydrogenation. Significant degradation in polymers having a polydispersity between 1.0 and about 1.2 can be defined as an increase of 30 percent or more in polydispersity after hydrogenation. Preferably, polymer degradation is such that less than a 20 percent increase in polydispersity occurs after hydrogenation, most preferably less than 10 percent. In polymers having polydispersity greater than about 1.2, a significant decrease in molecular weight after hydrogenation indicates that degradation has occurred. Significant degradation in this case is defined as a decrease in Mn of 20 percent or more. Preferably, a Mn decrease after hydrogenation will be less than 10 percent. However, polymers such as poly-alpha-methylstyrene or other alpha substituted vinyl aromatic polymers which are more prone to polymer degradation, can tolerate a decrease in Mn of up to 30 percent.

Typical hydrogenation temperatures are from about 50° C. preferably from about 100° C., more preferably from about 110° C., and most preferably from about 120° C. to about 250° C., preferably to about 200° C., more preferably to about 180° C., and most preferably to about 160° C.

The pressure of the hydrogenation reaction is not critical, though hydrogenation rates increase with increasing pressure. Typical pressures range from atmospheric pressure to 70 MPa, with 0.7 to 10.3 MPa being preferred.

The reaction vessel is purged with an inert gas to remove oxygen from the reaction area. Inert gases include but are not limited to nitrogen, helium, and argon, with nitrogen being preferred.

The hydrogenating agent can be any hydrogen producing agent which will efficiently hydrogenate the aromatic polymer. Hydrogenating agents include but are not limited to hydrogen gas, hydrazine and sodium borohydride. In a preferred embodiment, the hydrogenating agent is hydrogen gas.

The amount of olefinic hydrogenation can be determined using Infrared or proton NMR techniques. The amount of aromatic hydrogenation can be measured using UV-VIS spectroscopy. Cyclohexane solutions of polystyrene give a very distinct absorption band for the aromatic ring at about 260.5 nm. This band gives an absorbance of 1.000 with a solution concentration of 0.004980 moles of aromatic per liter in a 1 cm cell. After removing the catalyst via filtration (using a 0.50 micrometer ($\mu$m) "TEFLON™" filter, Millipore FHUP047) the reaction mixture is placed in a UV cell and the absorbance measured. The absorbance is dependent upon concentration. The hydrogenated polymer products are typically measured at higher concentrations since they are not diluted before the absorbance is measured. Since the reaction solution is about 15–30 times more concentrated than the standards, small amounts of residual unsaturation can be accurately measured.

The amount of hydrogenation is dependent upon the polymer being hydrogenated, the amount of catalyst used, the process conditions and the reaction time. For polymers such as polystyrene and styrene-butadiene copolymers, a typical hydrogenation is greater than 80%, greater than 99% hydrogenation is preferred, more preferably greater than 99.5%, and most preferably greater than 99.9%. This can be determined by measuring the absorbance of the hydrogenated polymer and comparing to the absorbance of a non-hydrogenated standard. In other words, the absorbance of a 99.9% hydrogenated polymer will be 99.9% less than the absorbance of the nonhydrogenated polymer. For polymers such as poly alpha-methylstyrene, styrene-alpha-methylstyrene copolymer and copolymers of a vinyl aromatic monomer and a comonomer selected from the group consisting of a nitrile, acrylate, acid, ethylene, propylene, maleic anhydride, maleimide, vinyl acetate and vinyl chloride, the level of hydrogenation can be lower, and is dependent upon the polymer being hydrogenated. Typically, at least 10% hydrogenation is achieved, preferably at least 25%, more preferably at least 50% and most preferably at least 90% hydrogenation is achieved.

In polymers containing only olefinic unsaturation, the hydrogenation level is typically greater than 90%, preferably greater than 95%, more preferably greater than 99% and most preferably greater than 99.9%.

In one embodiment of the present invention the unsaturated polymer is typically dissolved in a solvent and placed in a reactor with an appropriate amount of silica supported hydrogenation catalyst. The reactor is sealed, purged with an inert gas, pressurized with hydrogen and heated to the desired temperature for a time sufficient to substantially hydrogenate the aromatic polymer. The hydrogenated polymer is removed and the catalyst can be separated from the hydrogenated polymer by any conventional catalyst separation method, such as filtration or centrifugation.

The following examples are set forth to illustrate the present invention and should not be construed to limit its scope. In the examples, all parts and percentages are by weight unless otherwise indicated.

The amount of hydrogenation is measured using UV-VIS spectroscopy as described previously.

Mn is a number average molecular weight measured by gel permeation chromatography, unless otherwise specified.

All polymer samples used in the examples have atactic stereostructure.

EXAMPLES

Preparation of the catalyst

A solution of 2.72 g of $H_2PtCl_6.H_2O$ and 56.76 grams of purified water is prepared and added to 19.45 grams of silica. The water is evaporated overnight and the silica is further dried at 110° C. in an air purged oven for 30 minutes. The catalyst is then reduced in flowing hydrogen at 150° C. for 1 hour. The physical properties include pore area of 72 m²/g and total intrusion volume of 1.0559 cc/g, giving a 4V/A average pore diameter of 563 angstroms. The pore size distribution is narrow, wherein 85% of the total pore volume is in pores of 300 to 700 angstroms and 92% is from 100 to 750. Only a very small amount of the total pore volume is in pores smaller than 200 (less than 3 percent).

Hydrogenation

A 0.95 g sample of the reduced catalyst described above is added to 200 g of a 15 wt. percent solution of a triblock copolymer (75 wt. percent polystyrene and 25 wt. percent butadiene, having a Mn of 60,000) in a stirred autoclave style reactor. The reactor is sealed and the vapor space purged with nitrogen and filled with hydrogen. The temperature is then raised to about 165° C. ad the reactor is pressurized with hydrogen to 10.3 MPa. The polymer undergoes rapid hydrogenation and analysis show 100 percent saturation of the olefin region and greater than 99.97 percent hydrogenation of the aromatic region. After filtration the catalyst is reused in a subsequent hydrogenation reaction with similar results. Comparative example A solution of 0.699 g of $H_2PtCl_6.H_2O$ and 4.39 grams of purified water is prepared and added to 2.26 grams of silica. The water is evaporated overnight and the silica is further dried at 110° C. in an air purged oven for 30 minutes. The catalyst is then reduced in flowing hydrogen at 150° C. for 1 hour. The physical properties include pore area of 59 m²/g and total intrusion volume of 1.75 cc/g, giving a 4V/A average pore diameter of 1190 angstroms. The catalyst consumed hydrogen at a rate 3 fold slower than the catalyst of Example 1.

What is claimed is:

1. A silica supported metal hydrogenation catalyst, characterized in that the silica has a pore size distribution such that at least 95 percent of the pore volume is defined by pores having diameter from 300 to 1000 angstroms, less than 4 percent of the pore volume is defined by pores having a diameter of 200 angstroms or less.

2. The catalyst of claim 1 wherein the metal is selected from the group consisting of nickel, cobalt, rhodium, ruthenium, palladium, platinum, and combinations thereof.

3. The catalyst of claim 2 wherein the metal comprises rhodium or platinum.

4. The catalyst of claim 1 wherein a deactivation resistant component is additionally present.

5. The catalyst of claim 4 wherein the deactivation resistant component is selected from the group consisting of a rhenium, molybdenum, tungsten, tantalum or niobium component or mixtures thereof.

6. A process for hydrogenating an unsaturated polymer having a number average molecular weight (Mn) of from 40,000 to less than 120,000 comprising contacting the polymer with a hydrogenating agent in the presence of the silica supported metal hydrogenation catalyst of claim 1.

7. The process of claim 6 wherein the metal is selected from the group consisting of nickel, cobalt, rhodium, ruthenium, palladium, platinum, and combinations thereof.

8. The process of claim 7 wherein the metal comprises rhodium or platinum.

9. The process of claim 6 wherein a deactivation resistant component is additionally present.

10. The process of claim 9 wherein the deactivation resistant component is selected from the group consisting of a rhenium, molybdenum, tungsten, tantalum or niobium component or mixtures thereof.

11. The process of claim 6 wherein the aromatic polymer comprises polystyrene.

12. The process of claim 6 wherein the aromatic polymer comprises a block copolymer of a conjugated diene and a vinyl aromatic monomer.

13. The process of claim 6 wherein the aromatic polymer has a Mn of less than 110,000.

14. The process of claim 6 wherein the aromatic polymer has a Mn of less than 100,000.

* * * * *